June 21, 1927.

J. E. SMID 1,632,858

TRACTOR GUIDE

Filed Jan. 8, 1926

Joseph E. Smid
Inventor

By Lancaster and Alwine
Attorneys

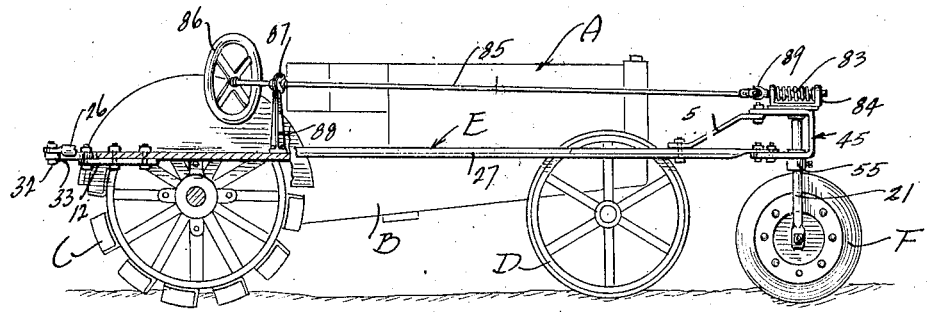
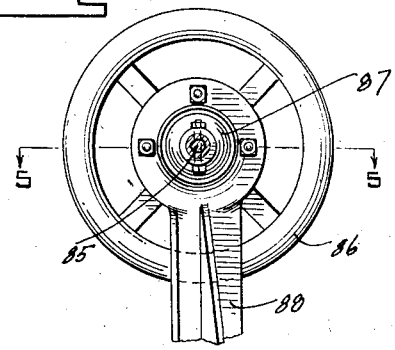
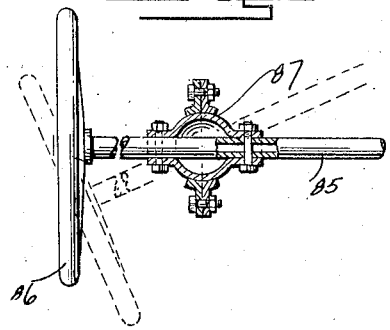
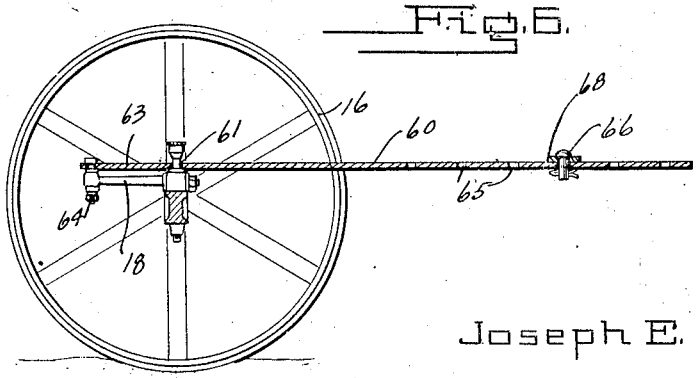

June 21, 1927.
J. E. SMID
1,632,858
TRACTOR GUIDE
Filed Jan. 8, 1926
3 Sheets-Sheet 3
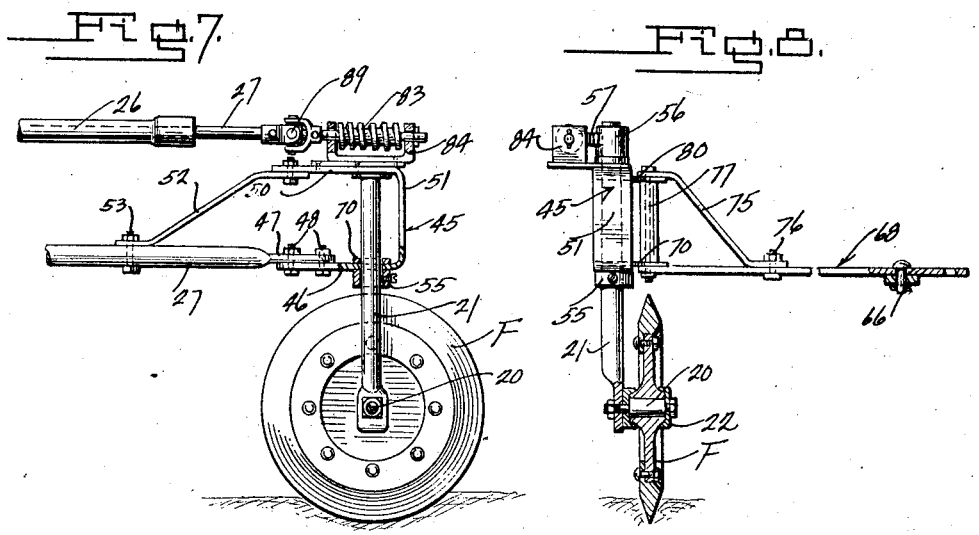
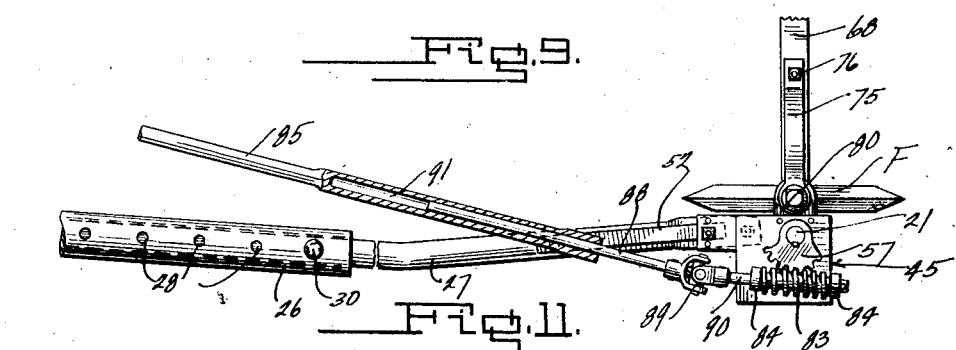
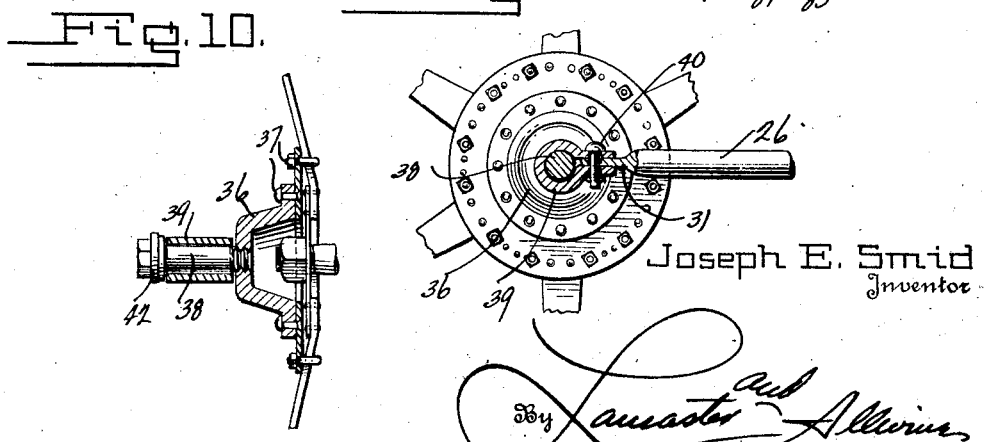
Joseph E. Smid
Inventor Patented June 21, 1927.

1,632,858

UNITED STATES PATENT OFFICE.

JOSEPH E. SMID, OF FOWLER, KANSAS.

TRACTOR GUIDE.

Application filed January 8, 1926. Serial No. 80,125.

This invention relates to improvements in tractor steering mechanisms.

The primary object of this invention is the provision of an improved tractor construction, embodying novel steering means capable of being guided by means of a ground furrow, without manual assistance.

A further object of this invention is the provision of steering mechanism for tractors, including a furrow following wheel or element connected in such relation to the tractor steering mechanism that the steering mechanism will accurately respond to slight pressure incident to the following of the wheel in the furrow.

A further object of this invention is the provision of improved steering mechanism for tractors, including means for automatically steering the tractor along a furrow, and including means to manually steer the tractor.

A further object of this invention is the provision of an adjustable steering guide for tractor, capable of application to tractors for a wide range of steering adjustment, and including means to easily steer the tractor manually or automatically along a furrow or the like.

Other objects and advantages of this invention will be apparent during the course of the following detailed description.

In the accompanying drawings, forming a part of this specification, and wherein similar reference characters designate corresponding parts throughout the several views, Figure 1 is a plan view of the tractor, showing the application of the improved steering guide mechanism thereto.

Figure 3 is a side elevation of the tractor and its steering guide mechanism.

Figure 4 is a sectional view taken substantially on the line 4—4 of Figure 2.

Figure 5 is a sectional view taken substantially on the line 5—5 of Figure 4.

Figure 6 is a fragmentary sectional view taken substantially on the line 6—6 of Figure 2.

Figure 7 is a fragmentary view, partly in section, of the furrow wheel mounting of the improved steering attachment for tractors.

Figure 8 is a view, partly in section, of the attachment, the same being taken at right angles to the view illustrated in Figure 7.

Figure 9 is a fragmentary plan view, partly in section, of the improved steering guide attachment.

Figures 10 and 11 are views showing the means by which the improved steering guide may be connected to a hub extension upon a traction wheel of the tractor.

Figure 1:
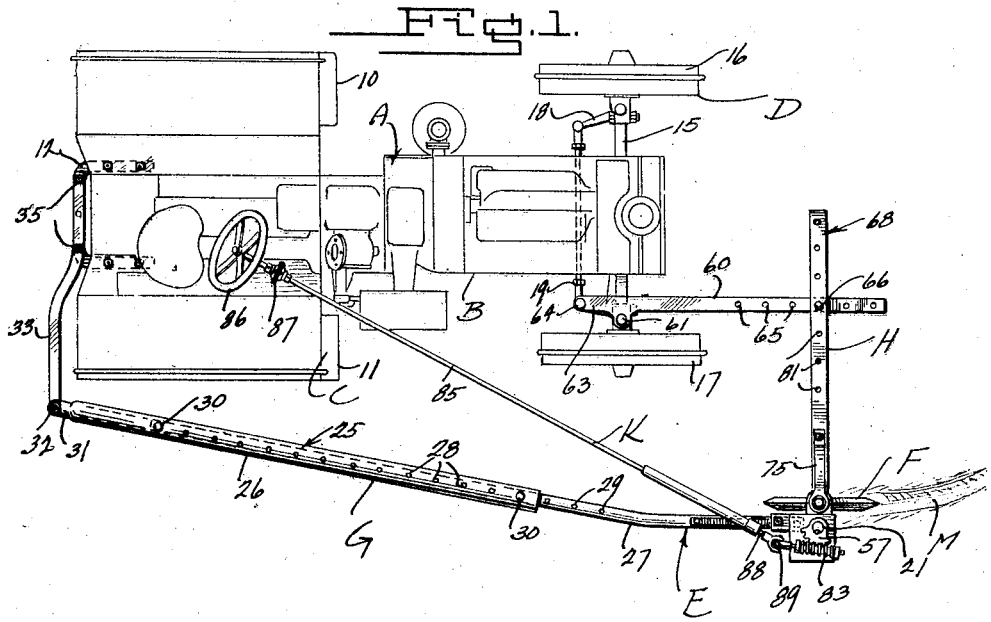

In the drawings, wherein for the purpose of illustration is shown a preferred embodiment of this invention, the letter A may generally designate a tractor, which may include a frame B having rear running and traction gear C connected therewith, and front running and steering gear D connected therewith. The improved steering guide attachment E may comprise a furrow following wheel F mounted to the rear of the tractor by means G and having means H connecting the same with the steering gear of the tractor. Means K is provided for manually operating the steering guide attachment.

The vehicle A is preferably a tractor, and the frame B thereof may vary as to construction. In the preferred instance the rear running and traction gear C includes a pair of wheels 10 and 11 suitably connected with the engine of the tractor to a differential mechanism. At the rear end of the frame of the tractor a draw bar cap or construction 12 may be provided of any approved form, to which the means G of the steering device or attachment E may be connected.

The tractor front running and steering gear may preferably include a stationary axle 15 to the outer ends of which steering wheels 16 and 17 are oscillatively connected on conventional steering knuckles which include the steering arms 18. The arms are suitably connected by a tie bar 19 in approved manner. Other steering gear may be provided.

The furrow guide wheel F is preferably rotatably mounted upon a conical shaped spindle 20, supported in right angular relation at the lower end of a vertical oscillating shaft or member 21. The guide wheel F at the outer periphery thereof is preferably V-shaped, in order that the same may conveniently follow in a furrow or ground groove. The wheel F is provided at the center thereof with a tapered opening thru which the spindle 20 is placed, and the wheel F is maintained in rotatable relation upon the spindle 20 by means of a nut and lock construction 22, which may be taken up from time to time to compensate for wear on the spindle 20.

The furrow wheel shaft 21 is vertically mounted for rotation about its axis, at the forward end of the means G, which may be suitably termed a frame. The frame G preferably includes the longitudinally adjustable push bar construction 25, which in one form of invention may include a tubular section 26 within which a rod portion 27 is telescopically placed. The sections 26 and 27 are respectively provided with spaced transverse openings 28 and 29, adapted to align when the sections are telescopically disposed, for receiving transverse connecting bolts or pins 30 in order to rigidly connect said sections 26 and 27 in a desired extension. The section 26 at the rear end thereof is preferably provided with a reduced extension 31, pivoted at 32 to the laterally extending end of a supporting rod 33, which may be supported upon the draw bar 12 of the tractor A, as by bolts 35.

One of the rear traction wheels, or both of the same, may be provided, as illustrated in Figures 10 and 11, with a hub extension to which the rear end of the push bar section 26 may be pivoted. A hub piece or cap 36 of durable construction may be bolted at 37 to the outer side of a traction wheel, and axially of the traction wheel a spindle 38 may extend outwardly from the wheel, a suitable distance to permit of the connection of a pivoted sleeve 39 thereon; the sleeve 39 of course being pivotally connected at 40 with the rear extension 31 of the push bar section 26, as illustrated in Figure 11 of the drawings. The spindle 38 at its outer end may have an adjustable nut 42 to retain the sleeve 39 in place upon said spindle. Other pivoted connections for the rear end of the push bar construction 25 may suggest themselves, in order that the force incident to steering and rolling of the furrow wheel over the ground surface, may be transmitted to parts of the tractor frame and gear best adapted to receive the same.

A bracket 45 is provided at the forward end of the push bar section 27 for rotatably receiving the vertical shaft 21 of the furrow wheel F. The bracket 45 is of U-shaped formation including a lower horizontal leg 46 which at the free end thereof is connected to the forward end 47 of the push bar section 27 by means of bolts 48. The bracket 45 also includes an upper horizontal leg 50 spaced above and parallel with the leg 46 and connected therewith by means of the vertical portion 51. At its free end the upper leg 50 is braced and supported by means of a diagonal brace rod 52 which connects at its upper end with the leg 50 and at its lower end being bolted at 53 to the push bar section 27, as illustrated in Figure 7 of the drawings.

The legs 46 and 50 are provided with openings thru which the wheel shaft 21 rotatably extends, and a locking collar 55 is placed on the shaft 21 below the arm 46 to support the bracket 45 and the forward end of the push bar construction 25, with respect to the furrow wheel F.

At its upper end the furrow wheel shaft 21 extends above the top leg 50 of the bracket 45, and is there connected by means of a sleeve 56 with a toothed segment 57; the latter being keyed for movement with the shaft 21, as illustrated in Figure 9.

Referring to the means H which connects the furrow wheel and adjacent construction with the steering mechanism of the tractor, the same preferably includes a relatively long steering arm or rod 60, which at the rear end thereof may be suitably connected, preferably detachably, in any approved manner to a steering knuckle at the steering mechanism of the tractor; to the steering arm; or to the tie rod of the steering mechanism of the tractor. Preferably the steering arm 60 of the means H is pivoted at 61, axially with the steering knuckle of one of the steering wheels of the tractor, and the steering arm 60 preferably includes a rear extension 63 extending rearwardly from the pivot 61 and at its end connected by bolt 64 with the outer end of one of the steering arms 18 of the conventional steering gear, at an outer end of the tie rod 19, as clearly illustrated in both Figures 1 and 2 of the drawings. This steering rod 60 is detachable so that it may be connected to either of the steering knuckles of the steering wheels 16 and 17, as illustrated in the two positions shown in Figures 1 and 2. The steering rod extends forwardly beyond the tractor A, for a considerable distance, from three to five feet, although these dimensions are not to be taken in a limiting sense. Along the length of the rod 60 forwardly of the steering wheels 16 and 17 the said rod or arm 60 is provided with a series of openings 65, in which a bolt or pin or like pivot means 66 may detachably connect, for adjustably connecting an inner end of a furrow wheel connecting arm or rod 68 thereto, in adjustable relation therealong.

The arm 68 is preferably connected at its outer end by means 70, in rigid relation with the lower leg 46 of the bracket 45. It is also connected by a diagonal brace 75 with the upper leg 50; the brace 75 at its lower end being connected at 76 with the connecting bar or tie rod 68 and at its upper end being connected at 80 with the said bracket leg 50. A spacing member 77 may be arranged between the outer end of the rod 68 and the upper end of the diagonal brace 75, as illustrated in Figure 8 of the drawings. The connecting bar or rod 68 is provided with a series of openings 81 therein which may receive the means 66 by which it is connected to the steering arm 60 of the means H, as illustrated in Figures 1 and 2 of the drawings.

Referring to the steering means K, the same includes a worm 83 rotatably mounted on bearings 84 formed on the bracket 45; the worm 83 of course meshing with the teeth of the sector 57. A steering post or rod 85 is provided at one end having a steering wheel 86 thereon, and adjacent to said steering wheel the post 85 preferably being mounted by means of a universal joint 87 upon a suitable bracket or connection 88 of the tractor frame. With this universal connection 87 the post 85 may swing about such connection, in order that the forward end thereof may move transversely of the tractor, as the attachment is moved to guide the steering of the tractor. At its free end the post 85 is preferably provided with a slip joint connection and universal connection with the worm 83, and to this end it is preferred to provide a rod 88 connected by a universal joint 89 to the rear end of the worm shaft 90; the rod 88 being telescopically slidable in a passageway 91 at the free end of the steering post 85, as illustrated in Figure 9 of the drawings.

Figure 2:
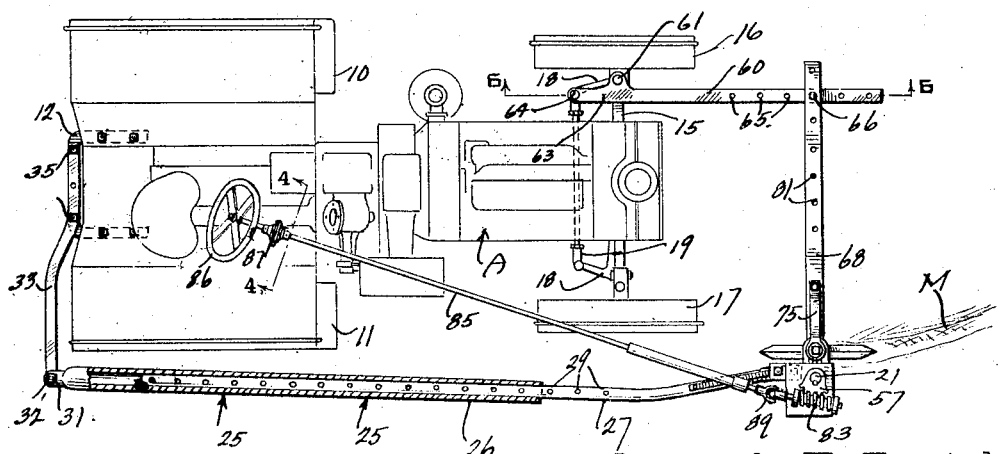
Figure 2 is a plan view of the tractor and steering guide mechanism applied differently to the tractor than illustrated in Figure 1.

During the automatic operation of the steering attachment, the wheel F is adapted to ride in a furrow M, such as illustrated in Figures 1 and 2 of the drawings, and in this connection the attachment E is not only to be used during plowing, where the furrow is conventionally formed, but may be used when the tractor is propelling other agricultural implements such as harvesters, threshers, harrows, and the like; it being purposed to provide a furrow as the tractor propels agricultural implements which do not naturally create a furrow, in order that such furrows may receive the wheel F in a succeeding operation.

It is at once apparent that, depending upon the point of connection 66 which the tie rod 68 has along the steering rod 60, the steering may be rendered more or less difficult, since the farther away the connection 66 from the steering knuckle, the easier will be the steering action due to increased leverage. Therefore, if it is desired to have a relatively easy automatic steering action the tie rod 68 is connected at the outer or forward end of the steering rod 60. The worm 83 is set, during the automatic operation of the device, so that the plane of the furrow wheel F is arranged in right angled relation with respect to a line drawn from the wheel F to the point of intersection of the rods 68 and 60. As the tractor A travels forwardly the guide wheel F will of course ride along the furrow M, and if there are any curves in the furrow M, the push bar construction 25 will be pivotally moved at its rear end, to permit the wheel F to ride along the furrow, and consequently the steering rod 60 will be pivotally moved to move the steering gear of the tractor and guide the latter. During this movement the slip joint between the steering post 85 and the worm 83 takes care of any elongation or shortening of the steering post connection, as can readily be understood. Incident to the adjustability of the push bar E, in length, the tie rod 68 may be applied at different places along the steering rod 60, without disturbing the relation which the furrow wheel F should bear with respect to the pivot pin 66. The rods 60 and 68 are adjustable along the lengths of each other, to obtain a desired steering effect.

In case the furrow is close to the right wheels of the tractor, and the distance from the guide wheel F to the steering arm or rod 60 is very short, then said steering arm or rod 60 may be fastened to the left hand steering knuckle, as illustrated in Figure 2 of the drawings, and the steering controlled in the same manner as above described.

The tractor may be manually steered by operating the wheel 86 of the steering post, when the tractor is propelled over flat ground, without a furrow, as is readily obvious.

Various changes in the shape, size, and arrangement of parts may be made to the forms of invention herein shown and described, without departing from the spirit of the same or the scope of the claims.

I claim:

1. In a vehicle steering guide attachment the combination with a vehicle including supporting wheels and steering gear therefor, a steering rod connected with the steering gear for movement therewith and projecting forwardly of the tractor, a furrow wheel, means dirigibly connecting the furrow wheel in adjustable relation with the forward end of said steering rod, means adjustably connecting said furrow wheel in pivoted relation with said vehicle rearwardly of the steering gear, and means for manually operating said furrow wheel.

2. In a steering guide for tractors the combination with a tractor including front running and steering wheels and steering gear therefor, a relatively long steering rod connected with the steering gear and extending forwardly of the steering wheels of the tractor, a furrow wheel, an extensible push bar, means connecting the furrow wheel with the forward end of the push bar, means pivotally connecting the push bar at its rear end upon said tractor, a connecting rod, means to connect the rod with the forward end of the push bar at one end, and means to longitudinally adjustably connect the other end of the connecting rod with the forward end of said steering rod.

3. In a steering guide for tractors the combination with a tractor including front steering wheels and steering gear therefor, a relatively long steering rod connected with the steering gear and extending forwardly of the steering wheels of the tractor, a furrow wheel, an adjustable push bar, means dirigibly connecting the furrow wheel upon the forward end of the push bar, means pivotally connecting the push bar at its rear end upon said tractor, a connecting rod connected with the forward end of the push bar at one end and adjustably connected with the forward end of said steering rod, and means for manually operating said furrow wheel.

4. In a steering guide device for vehicles the combination with a vehicle including supporting wheels and steering gear, a furrow guide wheel, means connecting the furrow guide wheel with the steering gear for automatic operation of the said steering gear when the wheel travels along a furrow, means for connecting the furrow wheel with the rear of the tractor to transmit thrust to the rear of the tractor incident to operation of the furrow wheel along the ground during the steering action thereof, and means for manually operating the furrow guide wheel to manually steer the steering gear of the tractor.

5. In a steering guide device for vehicles the combination with a vehicle including front running and steering gear, a steering rod connected with the steering gear for operation therewith and extending forwardly of the vehicle, a transverse arm adjustable along its length upon the steering rod and adjustable along the length of said steering rod and connected with the latter, a furrow wheel supported at the outer end of said transverse rod for operating in a furrow, and an extensible push bar pivotally connected at its rear end with the vehicle and at its forward end with said furrow wheel.

6. In a steering guide device for vehicles the combination with a vehicle including front running and steering gear, a steering rod connected with the steering gear for operation therewith and extending forwardly of the vehicle, a transverse arm adjustable along its length upon the steering rod and adjustable along the length of said steering rod and connected with the latter, a furrow wheel dirigibly supported at the outer end of said transverse rod for operating in a furrow, an extensible push bar pivotally connected at its rear end with the vehicle and at its forward end with said furrow wheel, and means extending to said vehicle for operating said furrow wheel manually.

7. In a steering guide device for tractors the combination with a tractor including front running and steering gear, a steering rod connected with said steering gear and extending forwardly of the tractor beyond the running gear thereof, a furrow wheel, a transverse rod, means pivotally mounting the furrow wheel at the outer end of the transverse rod, means for connecting the transverse rod at various distances along the length thereof upon and along the length of the steering rod, means to hold the furrow wheel in a determined steering relation for travel in a furrow, and an adjustable push bar connected with said transverse rod adjacent the furrow wheel and pivotally connected at its rear end adjacent the rear end of the tractor.

8. In a steering device of the class described the combination with a tractor including rear running and traction gear and front running and steering gear, a push bar, means connecting the push bar in pivoted relation at its rear end to the tractor adjacent the rear running gear, a furrow wheel, means pivotally mounting the furrow wheel upon the forward end of said push bar, means connecting the forward end of said push bar with the steering gear for operation of the latter as the furrow wheel travels along a furrow, and means for manually operating said furrow wheel to cause operation of said steering gear.

9. In a steering guide device for vehicles the combination with a vehicle including rear running gear and front running and steering gear, an extensible push bar, means connecting the rear end of the extensible push bar with the vehicle adjacent the rear running gear, a furrow guide wheel pivotally connected with the front end of said extensible push bar, means connecting the front end of said push bar with the steering gear for operation of the latter as the furrow wheel travels along a furrow, and means for manually operating the furrow wheel from the vehicle.

10. In a steering guide device for vehicles the combination with a vehicle including rear running gear and front running and steering gear, a push bar, means pivotally connecting the push bar to the vehicle adjacent the rear running gear, a furrow wheel, means pivotally mounting the furrow wheel at the front end of said push bar, means connecting the front end of the push bar with the steering gear for operation of the latter as the wheel travels along a furrow, and means for manually operating the furrow wheel from the tractor.

11. In a steering guide device for tractors the combination with a tractor including front running and steering gear, a steering rod connected with the steering gear for operation therewith, the steering rod extending forwardly of the tractor, a transverse bar pivotally connected with the steering rod forwardly of the tractor, a furrow wheel, means rotatably mounting the furrow wheel for rotation on a horizontal axis, the said means including a vertical shaft, a bracket in which the vertical shaft bears, the bracket being connected with said transverse bar, and a push bar connecting the bracket with the tractor.

12. In a steering guide device for vehicles the combination with a vehicle including a frame, rear running gear, and front running and steering gear, an extensible push bar, means pivotally connecting the extensible push bar with the tractor adjacent the rear running gear, a transverse bar pivotally connected with said extensible push bar at the front end thereof and forwardly of the front running and steering gear, a steering rod connected with the steering gear and extending forwardly of the tractor front running and steering gear for adjustable connection with the transverse bar, a furrow wheel caster pivoted adjacent the juncture of the transverse bar and front end of the extensible push bar for operating in a furrow to guide the action of the steering gear, and a steering post for operating the furrow wheel from the vehicle.

13. In a steering attachment for vehicles the combination with a vehicle including a frame, front running and steering gear, and rear running gear, a push bar pivotally connected with the vehicle and extending therealong, a bracket at the front end of the push bar, a furrow wheel, a vertical shaft rotatably supporting the furrow wheel for rotation on a horizontal axis, said vertical shaft being rotatable in said bracket, means connecting said bracket with the steering gear for operation of the latter as the furrow wheel operates in a furrow, and means for manually operating the furrow wheel from the vehicle independent of its operation in a furrow.

14. In a steering attachment for vehicles the combination with a vehicle including a frame, front running and steering gear, and rear running gear, a push bar pivotally connected with the vehicle and extending therealong, a bracket at the front end of the push bar, a furrow wheel, a vertical shaft rotatably supporting the furrow wheel for rotation on a horizontal axis, said vertical shaft being rotatable in said bracket, means connecting said bracket with the steering gear for operation of the latter as the furrow wheel operates in a furrow, and means for manually operating the furrow wheel from the vehicle independent of its operation in a furrow comprising a sector keyed upon said vertical shaft of the furrow wheel, a worm rotatable on the bracket in meshing relation with the sector, a steering post having universal pivoted connection upon the vehicle, and slip joint and universal means connecting the steering post with said worm.

15. In a steering guide device for tractors the combination with a tractor including a frame, rear running gear, and front running and steering gear, a furrow wheel, an extensible push bar supporting the furrow wheel at its front end and pivotally connected at its rear end adjacent the rear running gear of the tractor, and laterally and longitudinally adjustable means connecting the furrow wheel with the steering gear of the tractor for operation of the latter.

JOSEPH E. SMID.